May 15, 1923.
N. AYERS
LEVER MECHANISM
Filed July 24, 1922
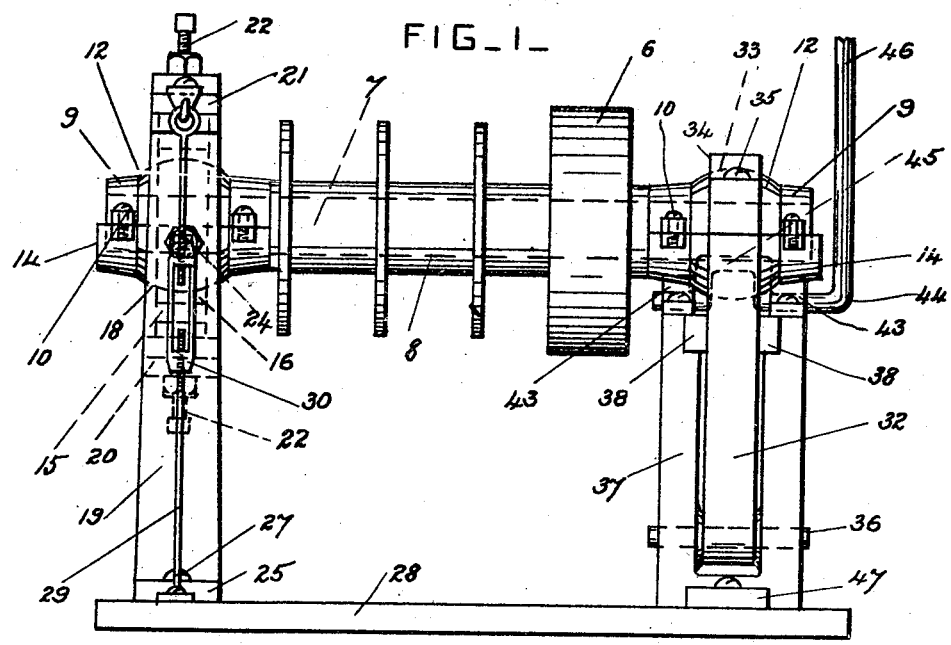
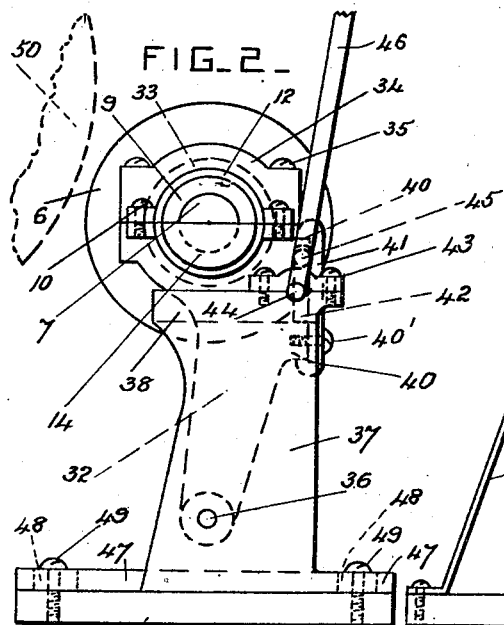
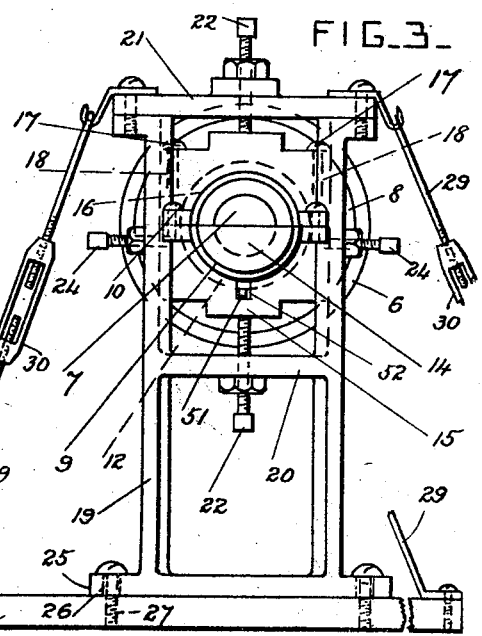
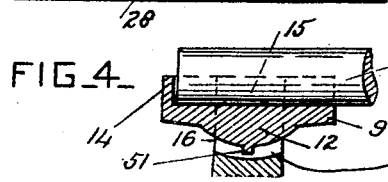
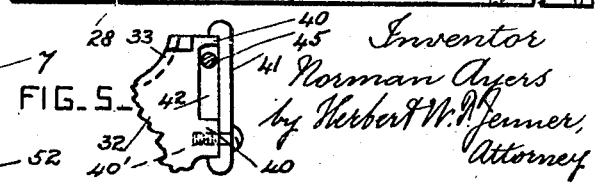
Inventor
Norman Ayers
by Herbert W. P. Jenner,
Attorney Patented May 15, 1923.

1,455,421

UNITED STATES PATENT OFFICE.

NORMAN AYERS, OF NEW STRAITSVILLE, OHIO.

LEVER MECHANISM.

Application filed July 24, 1922. Serial No. 577,127.

*To all whom it may concern:*

Be it known that I, NORMAN AYERS, a citizen of the United States, residing at New Straitsville, in the county of Perry and State of Ohio, have invented certain new and useful Improvements in Lever Mechanism, of which the following is a specification.

This invention relates to lever mechanism, specially adapted for use in rigs for drilling wells, for placing a friction driven wheel into and out of engagement with a friction driving wheel; and it consists in the novel construction and combination of the parts hereinafter fully described and claimed.

In the drawings, Figure 1 is a front view of a mechanism constructed according to this invention. Fig. 2 is an end view of one end of the mechanism; and Fig. 3 is an end view of its other end. Fig. 4 is a detail sectional view of the pin connection of the shaft bearings which prevents them from revolving. Fig. 5 is a detail view showing the slot 42.

A friction driven wheel 6 is secured on a shaft 7 together with a spool or winding barrel 8 which is used in connection with the drilling mechanism provided for drilling wells. The end portions of the shaft 7 are journaled in bearings 9 which are formed of upper and lower halves secured together by bolts 10. The middle portion 12 of each bearing is a portion of a ball or sphere. Each bearing has a plate 14 across the lower portion of its end which limits the endwise sliding movements of the shaft 7.

One of the bearings 9 is mounted in a bearing block 15 having a spherical socket 16 for the spherical portion 12 of the bearing to engage with, so that the bearing may move pivotally to a limited extent in all directions. The bearing block 15 is adjustable vertically in vertical guides 18 formed on a standard 19 having a lower crossbar 20. A removable upper crossbar 21 is secured to the standard 19 so that the bearing block can be placed in the guides.

The bearing block 15 is formed of upper and lower halves, which are secured together by bolts 17.

Adjusting screws 22 engage with screw-threaded holes in the upper and lower crossbars, and their ends hold the bearing block and afford a means for adjusting and supporting it in place. Locking screws 24 are screwed into the guides 18, and bear against the lower half of the bearing block 15, and lock it in position after it has been adjusted.

The standard 19 has feet 25 provided with elongated holes or slots 26, and 27 are bolts which engage with the slots 26, and secure the standard to a base plate 28. The slots 26 permit the position of the standard to be adjusted horizontally and crosswise of the shaft 7. Inclined stay rods 29 are secured to the upper crossbar 21 and to the base plate 28, and have turnbuckles 30 so that they may be tightened and placed under tension. These stay rods are arranged at the front and back of the standard 19, and they prevent it from vibrating.

The other shaft bearing 9 is mounted in the upper end portion of a lever 32, which has a spherical socket 33 for the spherical portion 12 of the bearing 12 to engage with. The upper part 34 of the socket is secured to the lower part by bolts 35. The lower end portion of the lever 32 is pivoted by a pin 36 to a forked standard 37 which has guides 38 at its upper part between which the lever is slidable. The socket 33 and the shaft bearing 12 are normally arranged on a vertical line drawn through the pivot pin 36, and directly over it, so that the lever is substantially balanced on the pin 36, and can be slid to a limited extent in each direction between the two parallel guides 38 with great facility.

The lever 32 has projecting lugs 40 on one side, and 41 is a cap secured over the said lugs by means of a bolt 40', and forming with the lever a vertical slot 42. The standard 37 has bearings 43 at its upper part, and 44 is a crankshaft pivoted in the bearings 43, and having a crankpin 45 which engages with the slot.

An operating lever 46 is secured to one end of the crankshaft and projects upwardly. The standard 37 has feet 47 provided with elongated holes or slots 48, and 49 are bolts which secure the feet 47 to the base plate 28, and permit the standard 37 to be adjusted crosswise of the shaft 7.

The lever 32 is oscillated by means of the operating lever 46 and the crank, so as to place the driven wheel 6 into and out of engagement with a friction driving wheel 50, a portion only of which is shown. Each bearing 9 has a pin 51 on its underside which engages with a cross-slot 52 in the socket which supports it, as shown in Fig. 4, and this pin connection prevents the bearing from being revolved by the shaft 7.

What I claim is:

1. In a lever mechanism, the combination, with a support, and a shaft having one end portion journaled therein: of a stationary standard, a lever having its lower part pivoted to the said standard and having at its upper part a spherical socket provided with a bearing for the other end portion of the said shaft, said socket being rigidly secured to the lever and the said bearing being free to rock in the socket and being normally arranged directly over the pivot of the lever, and means for oscillating the said lever on its pivot to vary the position of the said shaft.

2. A lever mechanism as set forth in claim 1, the said standard having two parallel guides arranged one on each side of its upper part below the socket in the lever and operating to prevent the lever from moving laterally.

3. A lever mechanism as set forth in claim 1, and having the bearings which have the said shaft journaled in them provided with plates at the ends of the shaft, said plates operating to limit the endwise movement of the shaft.

In testimony whereof I have affixed my signature.

NORMAN AYERS.